United States Patent
Labauze

(10) Patent No.: US 7,329,704 B2
(45) Date of Patent: Feb. 12, 2008

(54) RUBBER COMPOSITION FOR TIRE TREADS

(75) Inventor: Gerard Labauze, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 44 days.

(21) Appl. No.: 11/076,285

(22) Filed: Mar. 10, 2005

(65) Prior Publication Data

US 2005/0282950 A1 Dec. 22, 2005

Related U.S. Application Data

(63) Continuation of application No. PCT/EP03/009333, filed on Aug. 22, 2003.

(30) Foreign Application Priority Data

Sep. 10, 2002 (FR) .................................. 02 11202

(51) Int. Cl.
*C08K 5/01* (2006.01)
(52) U.S. Cl. ...................... 524/474; 524/518; 524/313; 524/482; 524/490; 524/335; 524/336; 524/347; 152/209

(58) Field of Classification Search ................ 524/474, 524/518, 313, 482, 490; 526/335, 336, 347; 152/209, 905
See application file for complete search history.

(56) References Cited

U.S. PATENT DOCUMENTS

| 4,840,988 | A | | 6/1989 | Nakayama et al. | |
|---|---|---|---|---|---|
| 4,866,131 | A | * | 9/1989 | Fujimaki et al. | ............... 525/96 |
| 5,901,766 | A | | 5/1999 | Sandstrom et al. | |
| 6,242,523 | B1 | | 6/2001 | Blok et al. | |
| 6,242,550 | B1 | | 6/2001 | Kralevich, Jr. et al. | |

FOREIGN PATENT DOCUMENTS

| EP | 1 035 164 A1 | 9/2000 |
|---|---|---|
| EP | 0 899 297 B1 | 10/2001 |
| EP | 1 050 547 B1 | 10/2004 |
| GB | 964931 | 7/1964 |

* cited by examiner

*Primary Examiner*—Robert D. Harlan
(74) *Attorney, Agent, or Firm*—Buchanan Ingersoll & Rooney

(57) ABSTRACT

The present invention relates to a cross-linkable or cross-linked rubber composition which is usable to constitute a tire tread having improved wear resistance, to such a tread and to a tire incorporating this tread. A rubber composition according to the invention comprises a diene elastomer of a number-average molecular weight Mn of less than 2000 g/mol which has a glass transition temperature Tg of greater than −25° C., and it is such that said elastomer comprises one or more units resulting from the polymerisation of a vinylaromatic monomer, such as styrene. The invention applies in particular to tires of passenger-vehicle type.

38 Claims, No Drawings

RUBBER COMPOSITION FOR TIRE TREADS

CROSS REFERENCE TO RELATED APPLICATION

This application is a continuation of PCT Application No. PCT/EP03/009333, filed Aug. 22, 2003, published in French as WO 2004/024813 on Mar. 25, 2004, which claims priority of French Application No. 02/11202, filed Sep. 10, 2002.

FIELD OF THE INVENTION

The present invention relates to a cross-linkable or cross-linked rubber composition which is usable to constitute a tire tread having improved wear resistance, to such a tread and to a tire incorporating this tread. The invention applies in particular to tires of passenger-vehicle or of heavy-vehicle type.

BACKGROUND OF THE INVENTION

Since fuel economies and the need to preserve the environment have become priorities, it has become desirable to produce mixes having good mechanical properties and as low a hysteresis as possible so that they can be processed in the form of rubber compositions usable for the manufacture of various semi-finished products involved in the constitution of tires, such as treads, and in order to obtain tires having reduced rolling resistance.

Among the numerous solutions proposed for reducing the hysteresis of tread compositions and, consequently, the rolling resistance of tires comprising such compositions, mention may for example be made of the compositions described in patent specifications U.S. Pat. No. 4,550,142, U.S. Pat. No. 5,001,196, EP-A-299 074 or EP-A-447 066.

An attempt has also been made to improve the grip of the tires using tread rubber compositions incorporating specific plasticizers.

European patent specification EP-A-1 035 164 thus describes a rubber composition for a tire tread which is intended to improve the grip on dry ground of the tire incorporating it. To this end, this composition comprises a liquid elastomer consisting of a polybutadiene the vinyl linkage content of which varies from 40 to 95%, the number-average molecular weight of which may attain 20,000 g/mol and the glass transition temperature Tg of which may vary from −40° C. to −5° C. This composition furthermore comprises a plasticizing resin the softening temperature of which varies from 30° C. to 200° C.

U.S. patent specification U.S. Pat. No. 6,204,320 also describes a rubber composition for a tire tread which is intended to improve the grip of the tire incorporating it. This composition comprises a liquid elastomer consisting of a copolymer of isoprene and of butadiene, the number-average molecular weight of which may reach 50,000 g/mol and the glass transition temperature Tg of which may vary from −50° C. to 20° C. This composition furthermore comprises an aromatic plasticizing oil and a plasticizing resin.

U.S. patent specification U.S. Pat. No. 4,866,131 also describes a rubber composition for a tire tread intended to improve the grip of the latter, comprising a copolymer of an aliphatic diene and a vinylaromatic monomer the number-average molecular weight of which may also reach 50,000 g/mol.

In addition to this reduction in the rolling resistance and this improvement in grip, it is equally desirable to improve the wear resistance of the tire treads and, consequently, to increase the life of the latter (this improved wear resistance also having the effect of reducing over time the debris of tires on the ground due to running and the quantity of worn tires which are sent for recycling, which helps to preserve the environment).

Relatively few solutions have been proposed to date to improve this wear resistance. Mention may be made, for example, of the compositions described in patent specifications JP-A-61 238501, EP-A-502 728 or EP-A-501 227. For it is well-known to the person skilled in the art that an improvement in one performance type for tires is frequently obtained to the detriment of the other performance types.

SUMMARY OF THE INVENTION

The object of the present invention is to propose a cross-linkable or cross-linked rubber composition which is usable to constitute a tire tread having improved wear resistance, and it is achieved in that the Applicants have recently surprisingly discovered that a diene elastomer of a number-average molecular weight Mn of less than 2000 g/mol, having a glass transition temperature Tg of greater than −25° C. and comprising one or more unit(s) resulting from the polymerisation of a vinylaromatic monomer, such as styrene, imparts to a tire, the tread of which is formed of a rubber composition incorporating this elastomer, improved wear resistance compared with that of known tires the tread of which comprises a plasticizing oil as plasticizer, while imparting to this tire according to the invention a rolling resistance and a grip on dry and damp ground which are close to those of these same known tires.

DETAILED DESCRIPTION OF THE INVENTION

"Diene elastomer" is understood to mean, in known manner, an elastomer resulting at least in part (homopolymer or copolymer) from diene monomers (monomers bearing two double carbon-carbon bonds, whether conjugated or not).

The or each diene elastomer of the composition according to the invention is preferably "highly unsaturated", that is to say that it has resulted from conjugated diene monomers having a molar content of units resulting from conjugated dienes which is greater than 50%.

Preferably, said elastomer has a number-average molecular weight Mn of from 500 g/mol to 1500 g/mol.

Preferably, said elastomer has a polymolecularity index Ip of less than 2 and, even more preferably, an index Ip of less than 1.5, or even less than 1.2.

Equally preferably, said elastomer has a glass transition temperature Tg of from −15° C. to 10° C.

Preferably, said diene elastomer comprises said units resulting from the polymerisation of a vinylaromatic monomer, such as styrene, in a mass fraction of from 10% to 80% and, even more preferably, in a mass fraction of from 30% to 70%.

Equally preferably, said diene elastomer belongs to the group consisting of copolymers of styrene and butadiene prepared in solution, terpolymers of styrene, butadiene and isoprene prepared in solution and copolymers of styrene and isoprene prepared in solution.

Preferably, said diene elastomer is a copolymer of styrene and butadiene prepared in solution comprising said units resulting from the polymerisation of styrene in a mass fraction of between 40% and 60%.

Equally preferably, said diene elastomer comprises units resulting from the polymerisation of butadiene, the mass fraction of vinyl linkages of which is of between 45% and 65%.

According to another characteristic of the invention, said composition furthermore comprises an elastomeric matrix in which is miscible said diene elastomer of a molecular weight Mn of less than 2000 g/mol, and, preferably, said matrix comprises:

(phr: parts by weight per hundred parts of elastomer(s) of said matrix):

in a quantity of greater than 30 phr and up to 100 phr, one or more diene elastomers each having a temperature Tg of between −65° C. and −10° C., and in a quantity of less than 70 phr and down to 0 phr, one or more diene elastomers each having a temperature Tg of between −110° C. and −80° C.

According to another preferred characteristic of the invention:

said or each diene elastomer of a temperature Tg of between −65° C. and −10° C. belongs to the group consisting of copolymers of styrene and butadiene prepared in solution, copolymers of styrene and butadiene prepared in emulsion, natural polyisoprenes, synthetic polyisoprenes having a cis-1,4 linkage content of greater than 95%, terpolymers of styrene, butadiene and isoprene and of a mixture of these elastomers, and said or each diene elastomer of a temperature Tg of between −110° C. and −80° C. and, preferably, of between −105° C. and −90° C., comprises polybutadiene units in a mass fraction equal to or greater than 70%, and it is advantageously constituted of a polybutadiene having a cis-1,4 linkage content of greater than 90%.

According to another preferred characteristic of the invention, said or each diene elastomer of a Tg of between −65° C. and −10° C. belongs to the group consisting of styrene/butadiene copolymers prepared in solution of a Tg of between −50° C. and −15° C. and of styrene/butadiene copolymers prepared in emulsion of a Tg of between −60° C. and −30° C.

According to one example of embodiment of the invention, said composition comprises said diene elastomer(s) of a Tg of between −65° C. and −10° C. in a quantity of 100 phr.

According to one variant embodiment of the invention, said composition comprises a blend of said diene elastomer(s) of a Tg of between −65° C. and −10° C. and of said diene elastomer(s) of a Tg of between −110° C. and −80° C.

According to a preferred example of embodiment according to the invention of this variant, said composition comprises a blend of at least one copolymer of styrene and butadiene prepared in solution as diene elastomer of a Tg of between −65° C. and −10° C., and of at least one polybutadiene having a cis-1,4 linkage content of greater than 90%, as diene elastomer of a Tg of between −110° C. and −80° C.

According to another example of embodiment according to the invention of this variant, said composition comprises a blend of at least one copolymer of styrene and butadiene prepared in emulsion as diene elastomer of a Tg of between −65° C. and −10° C., and of at least one polybutadiene having a cis-1,4 linkage content of greater than 90%, as diene elastomer of a Tg of between −110° C. and −80° C.

As copolymer of styrene and butadiene prepared in emulsion, there may advantageously be used copolymers having a quantity of emulsifier varying substantially from 1 phr to 3.5 phr, for example E-SBR copolymers comprising 1.7 phr and 1.2 phr of emulsifier respectively, both of which are described in European patent application EP-A-1 173 338 (see section I. of the examples of embodiment contained in the description of this application).

According to another preferred characteristic of the invention, said composition comprises said diene elastomer of a molecular weight Mn of less than 2000 g/mol in a quantity of from 10 phr to 50 phr and, even more preferably, in a quantity of from 30 phr to 45 phr.

According to an advantageous example of embodiment of the invention, said composition furthermore comprises, in a quantity of from 20 phr to 40 phr, a plasticizing resin of a number-average molecular weight of from 400 to 2000 g/mol and of a glass transition temperature of greater than 50° C. and less than 120° C. which comprises, in a mass fraction of from 70% to 100%, units resulting from the polymerisation of a monocyclic or bicyclic unsaturated terpene.

For the association of this resin with said diene elastomer of a molecular weight Mn of less than 2000 g/mol imparts to a tire the tread of which comprises this association a wear resistance which is improved still further, without adversely affecting the rolling resistance and the grip on dry and wet ground.

Preferably, said resin has a number-average molecular weight of from 500 to 1000 g/mol and, even more preferably, of from 550 to 700 g/mol.

Equally preferably, said resin has a glass transition temperature of from 60° C. to 100° C.

According to another preferred characteristic of the invention, said resin has a polymolecularity index of less than 2.

According to another preferred characteristic of the invention, said resin comprises said units resulting from the polymerisation of a monocyclic or bicyclic unsaturated terpene in a mass fraction of from 90% to 100%.

According to a first mode of embodiment of the invention, said unsaturated terpene from which the resin has resulted majoritarily or in its entirety is a monocyclic unsaturated terpene, preferably a limonene (i.e. 4-isopropenyl 1-methylcyclohexene) such as d-limonene (dextrorotatory enantiomer), or alternatively dipentene (racemate of the dextrorotatory and laevorotatory enantiomers of limonene).

According to a first example of embodiment according to the invention of this first mode, said resin furthermore comprises one or more units resulting from at least one monomer, whether hydrocarbon or not, which is not a monocyclic unsaturated terpene and which advantageously belongs to the group consisting of a bicyclic unsaturated terpene such as an α-pinene (i.e. 2,6,6-trimethylbicyclo[3.1.1]hept-2-ene), a monocyclic or polycyclic aromatic hydrocarbon such as styrene or an alkyl styrene, a cyclic diene such as dicyclopentadiene and a conjugated diene such as isoprene. This monomer may also be formed of acrylonitrile or alternatively of methyl methacrylate.

By way of examples of such resins according to this first example, mention may be made of those sold by DRT under the name "Dercolyte L120" and by ARIZONA under the names "Sylvares TR7125" and "Sylvagum TR7125C", which all comprise units resulting from the polymerisation of d-limonene or of dipentene in a mass fraction of between 90% and 100%.

According to a second example of embodiment according to the invention of this first mode, said resin is constituted of said units resulting from the homopolymerization of said monocyclic unsaturated terpene. A resin resulting in its entirety from the homopolymerization of d-limonene or dipentene, preferably a resin of a number-average molecular weight of from 550 g/mol to 650 g/mol and a glass transition temperature of from 60° C. to 80° C., is advantageously usable.

It will be noted that d-limonene is a natural extract (it is found in its natural state in the skin of oranges) and that, consequently, the plasticizing resin resulting from the homopolymerization of this d-limonene is of exclusively natural origin, which helps to reduce the pollution of the environment upon rolling of tires having treads which incorporate this resin.

According to a second mode of embodiment of the invention, said unsaturated terpene from which the resin has resulted majoritarily or in its entirety is a bicyclic unsaturated terpene, preferably an α-pinene.

According to a first example of embodiment according to the invention of this second mode, said resin furthermore comprises one or more units resulting from at least one monomer, whether hydrocarbon or not, which is not a bicyclic unsaturated terpene and which advantageously belongs to the group consisting of a monocyclic unsaturated terpene such as a limonene or dipentene, a monocyclic or polycyclic aromatic hydrocarbon such as styrene or an alkyl styrene, a cyclic diene such as dicyclopentadiene and a conjugated diene such as isoprene.

According to a second example of embodiment according to the invention of this second mode, said resin is constituted of said units resulting from the polymerisation of said bicyclic unsaturated terpene, such as α-pinene.

Preferably, the composition according to the invention comprises, in a quantity of from 20 phr to 25 phr, said diene elastomer of a molecular weight Mn of less than 2000 g/mol and, in a quantity of from 10 phr to 15 phr, said plasticizing resin.

According to another advantageous characteristic of the invention, said rubber composition furthermore comprises at least one plasticizing oil extracted from petroleum which is of paraffinic, aromatic or naphthenic type, in a quantity of from 0 phr to 25 phr and, preferably, of from 0 phr to 15 phr.

Advantageously, said rubber composition is totally devoid of any plasticizing oil extracted from petroleum.

It will be noted that the improvement of the wear resistance imparted by said diene elastomer of a molecular weight Mn of less than 2000 g/mol and possibly said resin to the tire according to the invention involves a reduction over time in the compaction by compression to which the tread according to the invention is subjected during travel and, consequently, a reduction over time of the loss during travel of the plasticizing oil extracted from petroleum which may possibly be present, such as the aromatic oil.

The result is an even more increased reduction in the pollution of the environment upon travel, which pollution is minimised still further by the reduced or zero quantity of oil which is initially present in the tread composition according to the invention.

The composition according to the invention also comprises a reinforcing filler, in a quantity which may vary from 50 to 150 phr.

According to a first example of embodiment of the invention, said reinforcing filler comprises a reinforcing inorganic filler in a mass fraction of from 50% to 100%.

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words being capable of replacing a conventional tire-grade carbon black filler in its reinforcement function.

Advantageously, the entirety or at the very least a majority proportion of said reinforcing inorganic filler is silica ($SiO_2$). The silica used may be any reinforcing silica known to the person skilled in the art, in particular any precipitated or fumed silica having a BET surface area and a CTAB specific surface area both of which are less than 450 $m^2/g$, even if the highly dispersible precipitated silicas are preferred.

Preferably, a silica having BET or CTAB specific surface areas which are both from 80 $m^2/g$ to 260 $m^2/g$ is used.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silicas Ultrasil 7000 and Ultrasil 7005 from Degussa, the silicas Zeosil 1165 MP, 1135 MP and 1115 MP from Rhodia, the silica Hi-Sil EZ150G from PPG, the silicas Zeopol 8715, 8745 and 8755 from Huber, and treated precipitated silicas such as, for example, the aluminum-"doped" silicas described in application EP-A-735 088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

As reinforcing inorganic filler, there may also be used, in non-limitative manner:

aluminas (of formula $Al_2O_3$), such as aluminas of high dispersibility which are described in European Patent Specification EP-A-810 258, or alternatively aluminum hydroxides, such as those described in International Patent Specification WO-A-99/28376.

Also suitable are reinforcing inorganic fillers comprising carbon blacks modified by silica such as, and this is non-limitative, the fillers sold by CABOT under the name "CRX 2000", which are described in International Patent Specification WO-A-96/37547.

According to a second example of embodiment of the invention, said reinforcing filler comprises carbon black in a mass fraction of from 50% to 100%. All the carbon blacks conventionally used in tires, and in particular in treads for these tires, particularly blacks of the type HAF, ISAF and SAF, are suitable. Mention may be made in non-limitative manner of the blacks N115, N134, N234, N339, N347 and N375.

According to a third example of embodiment of the invention, said reinforcing filler comprises a blend of said reinforcing inorganic filler with carbon black, the mass fraction of carbon black in said reinforcing filler being preferably selected to be less than or equal to 50%.

For example, black/silica blends or blacks partially or entirely covered with silica are suitable to form the reinforcing filler.

The rubber composition according to the invention furthermore comprises, in conventional manner, a reinforcing inorganic filler/elastomeric matrix bonding agent (also referred to as coupling agent), the function of which is to ensure sufficient chemical and/or physical bonding (or coupling) between said inorganic filler and the matrix, while facilitating the dispersion of this inorganic filler within said matrix.

"Coupling agent" is more precisely understood to mean an agent capable of establishing a sufficient chemical and/or physical connection between the filler in question and the elastomer, while facilitating the dispersion of this filler within the elastomeric matrix. Such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom;

T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any coupling agent known to or likely to ensure, in the diene rubber compositions which can be used for the manufacture of tires, the effective bonding or coupling between a reinforcing inorganic filler such as silica and a diene elastomer, such as, for example, organosilanes, in particular polysulphurized alkoxysilanes or mercaptosilanes, or alternatively polyorganosiloxanes bearing the X and Y functions mentioned above, may be used.

Silica/elastomer coupling agents in particular have been described in a large number of documents, the best known being bifunctional alkoxysilanes such as polysulphurized alkoxysilanes.

In particular polysulphurized alkoxysilanes, which are referred to as "symmetrical" or "asymmetrical" depending on their specific structure, are used, such as those described for example in patents U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the more recent patents U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085 and EP-A-1 043 357, which set forth such known compounds in detail.

Particularly suitable for implementing the invention, without the definition below being limitative, are symmetrical polysulphurized alkoxysilanes which satisfy the following general formula (I):

$$Z\text{-}A\text{-}S_n\text{-}A\text{-}Z, \text{ in which:} \quad (I)$$

n is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);
Z corresponds to one of the formulae below:

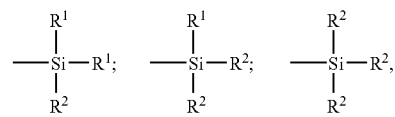

in which:
the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl),
the radicals $R^2$, which may or may not be substituted, and may be identical or different, represent a $C_1$-$C_{18}$ alkoxyl group or a $C_5$-$C_{18}$ cycloalkoxyl group (preferably $C_1$-$C_8$ alkoxyl groups or $C_5$-$C_8$ cycloalkoxyl groups, more preferably $C_1$-$C_4$ alkoxyl groups, in particular methoxyl and/or ethoxyl).

In the case of a mixture of polysulphurized alkoxysilanes in accordance with Formula (I) above, in particular conventional, commercially available, mixtures, it will be understood that the average value of the "n"s is a fractional number, preferably within a range from 2 to 5.

As polysulphurized alkoxysilanes, mention will be made more particularly of the polysulphides (in particular disulphides, trisulphides or tetrasulphides) of bis-(($C_1$-$C_4$)alkoxyl-($C_1$-$C_4$)alkylsilyl-($C_1$-$C_4$)alkyl), such as for example the polysulphides of bis(3-trimethoxysilylpropyl) or of bis(3-triethoxysilylpropyl). Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n close to 4). Mention will also be made of tetrasulphurized monoalkoxysilanes, such as monoethoxydimethylsilylpropyl tetrasulphide (abbreviated to MESPT), which are the subject of international patent application PCT/EP02/03774 in the name of the Applicants.

It will be noted that the or at least one of the diene elastomers usable in the composition according to the invention may comprise one or more functional groups specifically active for coupling to said reinforcing filler.

For coupling to a reinforcing inorganic filler, all the functional, coupled or starred groups which are known to the person skilled in the art for coupling to silica are suitable. In non-limitative manner, the following are suitable:
silanol or polysiloxane groups having a silanol end, as described in French patent specification FR-A-2 740

778 in the name of the Applicants. More precisely, this document teaches using a functionalising agent for a living polymer obtained anionically, in order to obtain a function which is active for coupling to silica. This functionalising agent is formed of a cyclic polysiloxane, such as a polymethylcyclo-tri-, -tetra- or -decasiloxane, said agent preferably being hexamethylcyclotrisiloxane. The functionalised polymers thus obtained can be separated from the reaction medium leading to their formation by steam extraction of the solvent, without their macrostructure and, consequently, their physical properties, changing; and alkoxysilane groups.

Mention may be made on this point of the functionalization reaction described in international patent specification WO-A-88/05448 for coupling to silica, which consists of reacting on a living polymer obtained anionically an alkoxysilane compound having at least one non-hydrolysable alkoxy radical. This compound is selected from among the haloalkyl alkoxysilanes.

Mention may also be made of patent specification FR-A-2 765 882, with regard to obtaining alkoxysilane functions. This document discloses the use of a trialkoxysilane, such as 3-glycidoxypropyltrialkoxysilane, for functionalising a living diene polymer, for coupling to carbon black having silica fixed to its surface as majority reinforcing filler.

For coupling to carbon black, mention may be made for example of functional groups comprising a C-Sn bond. Such groups may be obtained as is known per se by reaction with a functionalising agent of organohalotin type which may correspond to the general formula $R_3SnCl$, or with a coupling agent of organodihalotin type which may correspond to the general formula $R_2SnCl_2$, or with a starring agent of organotrihalotin type which may correspond to the general formula $RSnCl_3$, or of tetrahalotin type which may correspond to the formula $SnCl_4$ (where R is an alkyl, cycloalkyl or aryl radical).

For coupling to the carbon black, mention may also be made of aminated functional groups, for example obtained using 4,4'-bis-(diethylaminobenzophenone), also referred to as DEAB. Patent specifications FR-A-2 526 030 and U.S. Pat. No. 4,848,511 may be mentioned by way of example.

The compositions according to the invention also comprise, in addition to said elastomeric matrix, said diene elastomer of a weight Mn of less than 2000 g/mol, possibly said plasticizing oil and/or said plasticizing resin, said reinforcing filler and possibly said bonding agent, all or some of the other constituents and additives usually used in rubber compositions, such as pigments, antioxidants, antiozone waxes, a cross-linking system based on sulphur and/or peroxide and/or bismaleimides, one or more covering agents for the reinforcing inorganic filler such as alkylalkoxysilanes, polyols, amines or amides.

The compositions according to the invention may be prepared using known thermomechanical working processes for the constituents in one or more stages. For example, they may be obtained by thermomechanical working in one stage in an internal mixer which lasts from 3 to 7 minutes, with a speed of rotation of the blades of 50 rpm, or in two stages in an internal mixer which last from 3 to 5 minutes and from 2 to 4 minutes respectively, followed by a finishing stage effected at about 80° C., during which the sulphur and the vulcanisation accelerators in the case of a composition which is to be sulphur-cross-linked are incorporated.

A tire tread according to the invention is such that it comprises said rubber composition according to the invention.

A tire according to the invention comprises this tread.

The aforementioned characteristics of the present invention, as well as others, will be better understood on reading the following description of several examples of embodiment of the invention, which are given by way of illustration and not of limitation.

Determination of the molecular weights of the elastomers of low weight and possibly of the resins according to the invention by size exclusion chromatography (SEC):

Size exclusion chromatography or SEC makes it possible physically to separate macromolecules according to their size in the swollen state in columns filled with a porous stationary phase. The macromolecules are separated by their hydrodynamic volume, the bulkiest being eluted first. Although not an absolute method, SEC does enable an assessment to be made of the molecular weight distribution of the diene elastomers of low weight. On the basis of commercially available standards of polystyrene of low molecular weight (of between 104 and 90,000 g/mol), the various number-average Mn and weight-average Mw weights are determined and the polydispersity index Ip calculated. Each sample of elastomer of low weight is solubilized in tetrahydrofuran at a concentration of approximately 1 g/l.

The apparatus used is a "WATERS model Alliance 2690" chromatograph. The elution solvent is tetrahydrofuran (mobile phase), the flow rate is 1 ml/min., the temperature of the system is 35° C. and the duration of analysis is 40 min. A set of three columns in series, having the respective trade names "WATERS type STYRAGEL HR4E" (mixed-bed column), "WATERS type STYRAGEL HR1" (of a porosity of 100 Angstrom) and "WATERS STYRAGEL HR0.5" (of a porosity of 50 Angstrom) is used for the stationary phase.

The injected volume of the solution of each sample of elastomer is 100 µl. The detector is a "WATERS model 2410" differential refractometer and the chromatographic data processing software is the "WATERS MILLENNIUM" (version 3-2) system.

Measurement of the Glass Transition Temperatures of all the Elastomers

The glass transition temperatures Tg of the elastomers were measured by means of a differential calorimeter ("differential scanning calorimeter").

As far as the measurements of Tg for the rubber compositions incorporating these elastomers are concerned, dynamic measurements were carried out at a frequency of 10 Hz and at two different values of stresses (0.2 MPa and 0.7 MPa), which "MDC" measurements were carried out in accordance with ISO Standard 4664 (the mode of deformation being shearing and the test pieces being cylindrical).

Measurement of the Properties of the Rubber Compositions

Mooney viscosity: ML(1+4) at 100° C. measured in accordance with Standard ASTM D 1646 of 1999.

Moduli of elongation ME100 and ME300 (at 100 and 300%, expressed in MPa) measured in accordance with Standard ASTM D 412.

Scott break index: breaking load (MPa) and elongation (in %) measured at 23° C. in accordance with Standard ASTM D 412 of 1998.

Shore A hardness: measured in accordance with Standard ASTM D 2240 of 1997.

Hysteresis losses (HL): measured in % by rebound at 60° C. at the sixth impact, in accordance with the following equation: HL (%)=100×($W_0$−$W_1$)/$W_1$, with $W_0$: energy supplied and $W_1$: energy restored.

Dynamic shear properties: measured in accordance with Standard ASTM D 2231-71, reapproved in 1977 (measurement as a function of the deformation carried out at 10 Hz with a peak-to-peak deformation of 0.15% to 50%, and measurement as a function of the temperature carried out at 10 Hz under a repetitive stress of 70 or 20 N/cm$^2$ with a temperature sweep of −80 to 100° C.).

Measurement of the Performance of the Tires

Relative performance indices, relative to a reference index 100 characterising a "control" tire (a performance index greater than this base 100 indicating a performance superior to that of the corresponding "control" tire), were used.

The rolling resistance of each of the tires tested was measured by running on a test drum, at an ambient temperature of 25° C., under a load of 392 daN and at a speed of 80 km/h, the internal pressure of the tire being 2.1 bar, for tires of dimensions 175/70 R14 "MXT".

The wear resistance of each tire was determined by means of a relative wear index which is a function of the height of rubber remaining, after running on a winding road circuit, at an average speed of 77 km/h and until the wear reaches the wear indicators located in the grooves in the treads. This relative wear index was obtained by comparing the height of rubber remaining on a tread according to the invention with the height of rubber remaining on a "control" tread, which by definition has a wear index of 100.

The grip of each tire tested was evaluated by measuring braking distances in "ABS" braking mode, both on dry ground and on wet ground. More precisely, the braking distance in "ABS" mode was measured, on dry ground, going from a speed of 70 km/h to 20 km/h and, on wet ground (polished concrete surface with 2 mm of surface water), going from a speed of 40 km/h to 10 km/h.

The behaviour on wet ground of each tire was evaluated by the time taken to cover one lap of a wetted winding road circuit, an attributed value of 101 corresponding to a gain of 1 second over this lap of the circuit.

EXAMPLE 1

A "control" rubber composition T1 and two rubber compositions, one in accordance with the invention I1 and the other not in accordance with the invention I1', were prepared, each being intended to constitute a tread for a tire of "passenger-vehicle" type.

Table 1 below contains:
the formulation of each of these compositions T1, I1, and I1';
the properties of each composition T1, I1 and I1' in the non-vulcanised and vulcanised states;
the performances of tires, the respective treads of which are formed of these compositions T1, I1 and I1'.

In this Table 1:
S-SBR A is a copolymer of styrene and butadiene prepared in solution having:
  a 1,2-linkage content of 58%,
  a styrene linkage content of 25%,
  a Mooney viscosity ML(1+4) at 100° C. which is equal to 54,
  a quantity of oil equal to 37.5 phr, and
  a glass transition temperature Tg of −29° C.
BR A is a polybutadiene having:
  a very high cis-1,4 linkage content of approximately 93%, and
  a glass transition temperature Tg of −103° C. and
  a Mooney viscosity ML(1+4) at 100° C. which is equal to 54.
BP1 is a diene elastomer of low weight according to the invention constituted of a styrene/butadiene copolymer having:
  a 1,2-linkage content of 54% and a styrene linkage content of 50%,
  molecular weights Mn and Mw respectively of 1300 g/mol and 1500 g/mol, and
  a glass transition temperature Tg of −14° C.
BP2 is a diene elastomer of low weight which is not in accordance with the invention owing to its value Mn of greater than 2000 g/mol, constituted of a styrene/butadiene copolymer, having:
  a 1,2-linkage content of 62% and a styrene linkage content of 25%,
  molecular weights Mn and Mw respectively of 5075 g/mol and 10100 g/mol, and
  a glass transition temperature Tg of −16° C.
6PPD is N-(1,3-dimethyl-butyl)-N'-phenyl-p-phenylenediamine, and
CBS is N-cyclohexyl-benzothiazyl sulphenamide.

TABLE 1

|  | "Control" composition T1 | Composition I1 (invention) | Composition not in accordance with invention I1' |
|---|---|---|---|
| FORMULATION | | | |
| Elastomeric matrix | S-SBR A (57.5 phr) BR A (42.5 phr) | S-SBR A (47.5 phr) BR A (52.5 phr) | S-SBR A (47.5 phr) BR A (52.5 phr) |
| Reinforcing filler 1 | Silica Zeosil 1165MP (80 phr) | Silica Zeosil 1165MP (80 phr) | Silica Zeosil 1165MP (80 phr) |
| Reinforcing filler 2 | Carbon black N234 (10 phr) | Carbon black N234 (10 phr) | Carbon black N234 (10 phr) |
| Bonding agent "Si69/DPG" | 6.4/1.5 phr | 6.4/1.5 phr | 6.4/1.5 phr |
| Total aromatic oil | 39.5 phr | 0 phr | 0 phr |
| Elastomer BP1 | 0 phr | 38 phr | 0 phr |
| Elastomer BP2 | 0 phr | 0 phr | 38 phr |
| Stearic acid/ZnO | 2.0/2.5 phr | 2.0/2.5 phr | 2.0/2.5 phr |
| Antioxidant (6PPD) | 2 phr | 2 phr | 2 phr |
| Sulphur/accelerator (CBS)° | 1/2 phr | 1/2 phr | 1/2 phr |

TABLE 1-continued

|  | "Control" composition T1 | Composition I1 (invention) | Composition not in accordance with invention I1' |
|---|---|---|---|
| PROPERTIES | | | |
| ML(1 + 4) at 100° C. | 90 | 95 | 98 |
| Shore A | 66.5 | 67.0 | 65.7 |
| ME100 at 23° C. (MPa) | 1.69 | 1.52 | 1.50 |
| ME300 at 23° C. (MPa) | 1.91 | 1.64 | 1.60 |
| Scott break index at 23° C. (Deformation %/stress MPa) | 590/20.7 | 720/21.4 | 690/20.3 |
| HL at 60° C. | 29.4 | 31.4 | 32.2 |
| Dynamic properties at 10 Hz, at 0.7 MPa and 0.2 MPa stress | | | |
| Tg (MDC at 0.2 MPa) in ° C. | −31.5 | −33 | −36.5 |
| Tg (MDC at 0.7 MPa) in ° C. | −24 | −24 | −25 |
| Max Tan delta (at 0.7 MPa) | 0.80 | 0.74 | 0.70 |
| Dynamic properties at 10 Hz, deformation properties at 23° C. | | | |
| DELTA G*(G* − G* at 50%) | 5.71 | 6.31 | 6.52 |
| Tan delta max (at approximately 7% deformation) | 0.342 | 0.365 | 0.375 |
| PERFORMANCE OF THE TIRES (175/70 R14 "MXT") | | | |
| Wear resistance (at 15° C. on wet ground at 20%, for a Citroën Xantia 1.8 l) | 100 | 110 | 95 |
| Grip (at 20° C. for a Renault Laguna 2 l) | | | |
| ABS braking dry ground | 100 | 99 | 99 |
| ABS braking wet ground | 100 | 99 | 98 |
| Behavior on wet ground | | | |
| Lap time on a circuit in s (at 20° C., for a Golf 75) | 100 | 99.7 | 99.2 |
| Rolling resistance (10 kg/tonne) | 100 | 97.5 | 96 |

It will be noted that the Tgs of compositions I1 and I1', under a dynamic stress of high modulus (0.7 MPa), are provided to be substantially equal to the corresponding Tg of the "control" composition T1.

As can be seen in Table 1, the variance between the Tgs of the compositions I1 and T1 which were measured at a dynamic stress of low modulus, equal to 0.2 MPa, is very close to the variance between the Tgs of the same compositions I1 and T1 which were measured under said stress of high modulus. On the other hand, the variance between the Tgs of the compositions I1 and T1 which were measured at said dynamic stress of low modulus is significantly different from the variance between the Tgs of the same compositions I1' and T1 which were measured under said stress of high modulus.

This absence of difference between the Tgs when passing from a stress of high modulus to a stress of low modulus for compositions I1 and T1 expresses the fact that the diene elastomer BP1, of an Mn of less than 2000 g/mol, is readily miscible in the elastomeric matrix constituted by the S-SBR A and the BR A. Contrary to this, the difference between the Tgs when passing from a stress of high modulus to a stress of low modulus for the compositions I1' and T1 expresses the fact that the diene elastomer BP2, of an Mn of greater than 2000 g/mol, is not really miscible in this elastomeric matrix.

Furthermore, Table 1 shows that the diene elastomers of low weight BP1 and BP2 impart respectively to the compositions I1 and I1' substantially the same mechanical and dynamic properties as those of the "control" composition T1.

On the other hand, the results of wear resistance, grip and rolling resistance clearly demonstrate the advantage of using an elastomer of very low weight Mn and index Ip such as BP1 (Ip of less than 1.5), compared with the use of an elastomer such as BP2 of a weight Mn of greater than 2000 g/mol and of an Ip close to 2 which very adversely affects all these performances and in particular the wear resistance.

For the incorporation of the elastomer BP1 according to the invention in the composition I1 imparts to the tires the treads of which are constituted of this composition a wear resistance which is very greatly improved compared with that of the "control" composition T1 comprising as plasticizer an aromatic oil instead of BP 1, while retaining practically the grip and rolling-resistance performances of the tires incorporating said composition T1 and while maintaining or improving the mechanical properties (Scott break index) of said composition T1.

It will also be noted that the composition I1 does not comprise any aromatic oil unlike the composition T1, which helps to protect the environment.

EXAMPLE 2

A "control" rubber composition T2 and two rubber compositions, one in accordance with the invention I2 and the other not in accordance with the invention I2', were prepared, each being intended to constitute a tread for a tire of "passenger-vehicle" type.

Table 2 below contains:
the formulation of each of these compositions T2, I2, and I2';
the properties of each composition T2, I2 and I2' in the non-vulcanised and vulcanised states;
the performances of tires, the respective treads of which are formed of these compositions T2, I2 and I2'.

In this Table 2, S-SBR A, BR A and BP1 are as defined in Example 1 and BP3 is a diene elastomer of low weight which is not in accordance with the invention owing to its Tg, which is less than −25° C., BP3 being a homopolymer of butadiene (styrene linkage content of 0%) having:
a high 1,2-linkage content (equal to 71%);
molecular weights Mn and Mw of 750 g/mol and 810 g/mol respectively, and
a glass transition temperature Tg of −65° C.

It will be noted that the Tgs of compositions I2 and I2', under a dynamic stress of high modulus (0.7 MPa), are provided to be substantially equal to the corresponding Tg of the "control" composition T2.

As can be seen in Table 2, the variance between the Tgs of the compositions I2, I2' and T2 which were measured at a dynamic stress of low modulus, equal to 0.2 MPa, is very close to the variance between the Tgs of these compositions I2, I2' and T2 which were measured under said stress of high modulus.

This absence of difference between the Tgs when passing from a stress of high modulus to a stress of low modulus for compositions I2, I2' and T2 expresses the fact that each of the diene elastomers of low weight BP1 and BP3 is readily miscible in the elastomeric matrix constituted by the S-SBR A and the BR A.

TABLE 2

| | Composition T2 | Composition I2 | Composition I2' |
|---|---|---|---|
| FORMULATION | | | |
| Elastomeric matrix | S-SBR A (57 phr) BR A (43 phr) | S-SBR A (47 phr) BR A (53 phr) | S-SBR A (80 phr) BR A (20 phr) |
| Reinforcing filler 1 | Silica Zeosil 1165MP (80 phr) | Silica Zeosil 1165MP (80 phr) | Silica Zeosil 1165MP (80 phr) |
| Reinforcing filler 2 | Carbon black N234 (10 phr) | Caron black N234 (10 phr) | Carbon black N234 (10 phr) |
| Bonding agent "Si69/DPG" | 6.4/1.5 phr | 6.4/1.5 phr | 6.4/1.5 phr |
| Total aromatic oil | 39.5 phr | 0 phr | 4 phr |
| Elastomer BP1 | 0 phr | 39 phr | 0 phr |
| Elastomer BP3 | 0 phr | 0 phr | 36.5 phr |
| Stearic acid/ZnO | 2/2.5 phr | 2/2.5 phr | 2/2.5 phr |
| Antioxidant (6PPD) | 2 phr | 2 phr | 2 phr |
| Sulphur/accelerator (CBS)° | 1/2 phr | 1/2 phr | 1/2 phr |
| PROPERTIES | | | |
| ML(1 + 4) at 100° C. | 109 | 112 | 97 |
| Shore A | 66.5 | 67.2 | 64.2 |
| ME100 at 23° C. (MPa) | 1.69 | 1.52 | 1.45 |
| ME300 at 23° C. (MPa) | 1.93 | 1.56 | 1.52 |
| Scott break index 23° C. (Deformation %/stress MPa) | 600/20.7 | 750/21.4 | 690/19.8 |
| HL at 60° C. | 30.4 | 32.1 | 29.9 |
| Dynamic properties at 10 Hz, at 0.7 MPa and 0.2 MPa stress | | | |
| Tg (MDC at 0.2 MPa) in ° C. | −31.5 | −32 | −31.5 |
| Tg (MDC at 0.7 MPa) in ° C. | −24 | −24 | −25 |
| Max Tan delta (0.7 MPa) | 0.80 | 0.74 | 0.88 |
| Dynamic properties at 10 Hz, deformation properties at 23° C. | | | |
| DELTA G*(G* − G* at 50%) | 5.71 | 6.49 | 4.90 |
| Tan delta max (at approximately 7% deformation) | 0.349 | 0.385 | 0.339 |
| PERFORMANCES OF THE TIRES (175/70 R14 "MXT") | | | |
| Wear resistance (at 15° C. on wet ground at 20%, for a Citroën Xantia 1.8 l) | 100 | 109 | 70 |
| Grip (at 17° C. on a Renault Laguna 2 l) | | | |
| ABS braking dry ground | 100 | 99 | 102 |
| ABS braking wet ground | 100 | 98 | 106 |
| Behavior on wet ground | | | |
| Lap time on a circuit in s (at 22° C., for a Golf 75) | 100 | 99.7 | 97 |
| Rolling resistance (10 kg/tonne) | 100 | 97 | 103 |

Furthermore, Table 2 shows that the diene elastomers of low weight BP1 and BP3 impart respectively to the compositions I2 and I2' substantially the same mechanical and dynamic properties as those of the "control" composition T2.

On the other hand, the results of wear resistance, grip resistance and rolling resistance clearly demonstrate the advantage of using an elastomer of low weight of a Tg of greater than −25° C., such as BP1, relative to the use of an elastomer of low weight of a Tg of less than −25° C., such as BP3, which very adversely affects all these performances and in particular the wear resistance.

For only the incorporation of the elastomer BP1 according to the invention in the composition I2 imparts to the tires the treads of which are constituted of this composition a wear resistance which is very greatly improved compared with that of the "control" composition T2 comprising as plasticizer an aromatic oil instead of BP1, while retaining practically the grip and rolling-resistance performances of the tires incorporating said composition T2 and while maintaining or improving the mechanical properties (Scott break index) of said composition T2. This is not the case of the incorporation of the elastomer BP3 in the composition I2'.

It will also be noted that the composition I2 does not comprise any aromatic oil unlike the composition T2, which helps to protect the environment.

The invention claimed is:

1. A cross-linkable or cross-linked rubber composition which is usable to constitute a tire tread having improved wear resistance, said composition comprising a diene elastomer of a number-average molecular weight Mn of less than 2000 g/mol which has a glass transition temperature Tg of greater than −25° C., wherein said elastomer comprises one or more unit(s) resulting from the polymerization of a vinylaromatic monomer.

2. The rubber composition according to claim 1, wherein said elastomer has a number-average molecular weight Mn of from 500 g/mol to 1500 g/mol.

3. The rubber composition according to claim 1, wherein said elastomer has a polymolecularity index of less than 2.

4. The rubber composition according to claim 3, wherein said elastomer has a polymolecularity index of less than 1.5.

5. The rubber composition according to claim 1, wherein said elastomer has a glass transition temperature Tg of from −15° C. to 10° C.

6. The rubber composition according to claim 1, wherein said elastomer comprises said units resulting from the polymerisation of a vinylaromatic monomer in a mass fraction of from 10 to 80%.

7. The rubber composition according to claim 6, wherein said elastomer comprises said units resulting from the polymerisation of a vinylaromatic monomer in a mass fraction of from 30% to 70%.

8. The rubber composition according to claim 1, wherein the vinylaromatic monomer is styrene.

9. The rubber composition according to claim 1, wherein said diene elastomer is selected from the group consisting of copolymers of styrene and butadiene prepared in solution, terpolymers of styrene, butadiene and isoprene prepared in solution and copolymers of styrene and isoprene prepared in solution.

10. The rubber composition according to claim 9, wherein said diene elastomer is a copolymer of styrene and butadiene prepared in solution comprising said units resulting from the polymerisation of styrene in a mass fraction of between 40% and 60%.

11. The rubber composition according to claim 10, wherein said elastomer comprises units resulting from the polymerisation of butadiene, the mass fraction of vinyl linkages of which is of between 45% and 65%.

12. The rubber composition according to claim 1, which further comprises an elastomeric matrix which is miscible with said diene elastomer of a molecular weight Mn of less than 2000 g/mol, said matrix comprising:

(phr: parts by weight per hundred parts of elastomer(s) of said matrix):
  in a quantity of greater than 30 phr and up to 100 phr, one or more diene elastomers each having a temperature Tg of between −65° C. and −10° C., and
  in a quantity of less than 70 phr and down to 0 phr, one or more diene elastomers each having a temperature Tg of between −110° C. and −80° C.

13. The rubber composition according to claim 12, wherein:
  said or each diene elastomer of a temperature Tg of between −65° C. and −10° C. is selected from the group consisting of copolymers of styrene and butadiene prepared in solution, copolymers of styrene and butadiene prepared in emulsion, natural polyisoprenes, synthetic polyisoprenes having a cis-1,4 linkage content of greater than 95%, terpolymers of styrene, butadiene and isoprene and mixtures of these elastomers, and wherein:
  said or each diene elastomer of a temperature Tg of between −110° C., and −80° C. comprises polybutadiene units in a mass fraction equal to or greater than 70%.

14. The rubber composition according to claim 13, wherein said or each diene elastomer of a temperature Tg of between −65° C. and −10° C. is selected from the group consisting of copolymers of styrene and butadiene prepared in solution of a temperature Tg of between −50° C. and −15° C. and copolymers of styrene and butadiene prepared in emulsion of a temperature Tg of between −60° C. and −30° C., and in that said or each diene elastomer of a temperature Tg of between −110° C. and −80° C. is constituted of a polybutadiene having a cis-1,4 linkage content of greater than 90%.

15. The rubber composition according to claim 12, which comprises said diene elastomer(s) of a temperature Tg of between −65° C. and −10° C. in a quantity of 100 phr.

16. The rubber composition according to claim 12, which comprises a blend of at least one copolymer of styrene and butadiene prepared in solution, as diene elastomer of a temperature Tg of between −65° C. and −10° C., and at least one polybutadiene having a cis-1,4 linkage content of greater than 90%, as diene elastomer of a temperature Tg of between −110° C. and −80° C.

17. The rubber composition according to claim 12, which comprises a blend of at least one copolymer of styrene and butadiene prepared in emulsion, as diene elastomer of a temperature Tg of between −65° C. and −10° C., and at least one polybutadiene having a cis-1,4 linkage content of greater than 90%, as diene elastomer of a temperature Tg of between −110° C. and −80° C.

18. The rubber composition according to claim 12, wherein said diene comprises said diene elastomer of a molecular weight Mn of less than 2000 g/mol is present in a quantity of from 10 phr to 50 phr.

19. The rubber composition according to claim 18, wherein said diene elastomer of a molecular weight Mn of less than 2000 g/mol is present in a quantity of from 30 phr to 45 phr.

20. The rubber composition according to claim 18, which further comprises, in a quantity of from 20 phr to 40 phr, a plasticizing resin of a number-average molecular weight of from 400 to 2000 g/mol which comprises, in a mass fraction of from 70% to 100%, units resulting from the polymerisation of a monocyclic or bicyclic unsaturated terpene, said resin having a glass transition temperature Tg of greater than 50° C. and less than 120° C.

21. The rubber composition according to claim 20, wherein said resin has a number-average molecular weight of from 500 to 1000 g/mol and a polymolecularity index of less than 2.

22. The rubber composition according to claim 20, wherein said resin has a glass transition temperature of from 60° C. to 100° C.

23. The rubber composition according to claim 20, wherein said resin comprises said units resulting from the polymerisation of a monocyclic or bicyclic unsaturated terpene in a mass fraction of from 90 to 100%.

24. The rubber composition according to claim 20, wherein said unsaturated terpene is a monocyclic unsaturated terpene.

25. The rubber composition according to claim 24, wherein said monocyclic unsaturated terpene is limonene or dipentene.

26. The rubber composition according to claim 24, wherein said resin further comprises one or more units resulting from at least one monomer selected from the group consisting of a bicyclic unsaturated terpene, a monocyclic or polycyclic aromatic hydrocarbon, a cyclic diene and a conjugated diene.

27. The rubber composition according to claim 24, wherein said resin is formed of said units resulting from the polymerisation of said monocyclic unsaturated terpene.

28. The rubber composition according to claim 20, wherein said unsaturated terpene is a bicyclic unsaturated terpene.

29. The rubber composition according to claim 28, wherein said bicyclic unsaturated terpene is α-pinene.

30. The rubber composition according to claim 28, wherein said resin further comprises one or more units resulting from at least one monomer selected from the group consisting of a monocyclic unsaturated terpene, a monocyclic or polycyclic aromatic hydrocarbon, a cyclic diene and a conjugated diene.

31. The rubber composition according to claim 28, wherein said resin is formed of said units resulting from the polymerisation of said bicyclic unsaturated terpene.

32. The rubber composition according to claim 20, which comprises, in a quantity of from 20 phr to 25 phr, said diene elastomer of a molecular weight Mn of less than 2000 g/mol and, in a quantity of from 10 phr to 15 phr, said resin.

33. The rubber composition according to claim 1, which comprises in a quantity of from 0 phr to 15 phr, at least one plasticizing oil extracted from petroleum of paraffinic, aromatic or naphthenic type.

34. The rubber composition according to claim 33, which is devoid of plasticizing oil extracted from petroleum.

35. The rubber composition according to claim 1, said composition further comprising a reinforcing inorganic filler.

36. The rubber composition according to claim 35, wherein said reinforcing inorganic filler comprises a blend of said reinforcing inorganic filler, in a mass fraction of from 50% to 100%, with carbon black, in a mass fraction of from 50% to 0%.

37. A tire tread comprising a cross-linkable or cross-linked rubber composition according to claim 1.

38. A tire comprising a tread according to claim 37.

* * * * *